United States Patent [19]

Masaki et al.

[11] Patent Number: 4,476,361
[45] Date of Patent: Oct. 9, 1984

[54] DISCONNECT CONTACT ASSEMBLY

[75] Inventors: Nobuo Masaki, Fuchu; Tetsuo Yoshida, Fussa, both of Japan

[73] Assignee: Tokyo Shibaura Denki Kabushiki Kaisha, Kawasaki, Japan

[21] Appl. No.: 293,236

[22] Filed: Aug. 17, 1981

[30] Foreign Application Priority Data

Aug. 18, 1980 [JP] Japan ............................... 55-116034

[51] Int. Cl.³ .................... H01H 9/00; H01H 9/42; H01H 33/16
[52] U.S. Cl. .................... 200/305; 200/144 AP; 200/304; 200/50 AA; 174/142
[58] Field of Search ................ 200/144 AP, 304, 305, 200/50 AA; 174/142

[56] References Cited

U.S. PATENT DOCUMENTS

| 1,530,365 | 3/1925 | Hill ................................ 200/148 R |
| 3,160,727 | 12/1964 | Colclaser, Jr. et al. ..... 200/144 AP |
| 3,542,943 | 11/1970 | Aungst .............................. 174/142 |
| 4,104,497 | 8/1978 | Brealey ............................ 200/305 |
| 4,249,049 | 2/1981 | Fisher et al. ................ 200/144 AP |
| 4,351,989 | 9/1982 | Luxa .................................. 200/304 |

FOREIGN PATENT DOCUMENTS

| 630840 | 4/1963 | Belgium ............................ 174/142 |
| 922779 | 1/1955 | Fed. Rep. of Germany ...... 174/142 |
| 922890 | 1/1955 | Fed. Rep. of Germany ...... 174/142 |
| 2711166 | 9/1977 | Fed. Rep. of Germany . |
| 2704385 | 8/1978 | Fed. Rep. of Germany . |
| 5938 | of 1979 | European Pat. Off. . |
| 1330078 | 5/1963 | France ............................... 174/142 |
| 52-32530 | 3/1977 | Japan ................................. 174/142 |

*Primary Examiner*—Robert S. Macon
*Attorney, Agent, or Firm*—Oblon, Fisher, Spivak, McClelland & Maier

[57] ABSTRACT

According to the reciprocal movement of a movable arm, a stationary arm is connected or disconnected to fingers mounted to the movable arm. A metal ring electrically connected to the stationary arm and coated on the front end with an insulator coating surrounds a contact end of the stationary arm.

4 Claims, 8 Drawing Figures

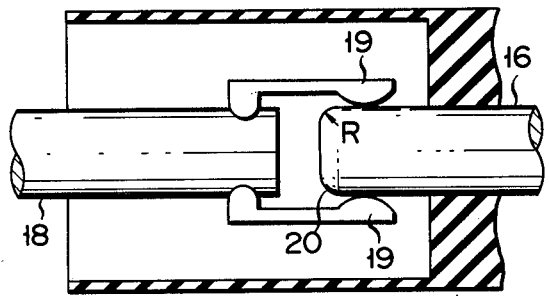

DISCONNECT CONTACT ASSEMBLY

BACKGROUND OF THE INVENTION

The present invention relates to a disconnect contact assembly for connecting and disconnecting electrical equipment inside an equipment compartment, with power source conductors and a load conductor in a bus compartment.

FIG. 1 shows the configuration of a typical conventional enclosed switchboard. Referring to FIG. 1, inside a switchboard box 1, partition walls form an equipment compartment 2, a power source compartment 3, and a load compartment 4. Front doors 5a and 5b are arranged for the equipment compartment 2 and the power source compartment 3, respectively, in such a manner that they are free to open and close. Power source buses 6 are disposed inside the power source compartment 3, and a load conductor 7 is disposed inside the load compartment 4. A current transformer 8 is connected to the load conductor 7 which is connected to a load cable 10 through a cable head 9. A circuit breaker 11 is housed inside the equipment compartment 2 to be in electrical contact with the power source buses 6 and the load conductor 7 through upper and lower disconnecting switches 12 and 13 mounted to the partition walls defining the equipment compartment 2 and the compartments 3 and 4. FIG. 2 shows the electrical connections of the respective parts shown in FIG. 1. In FIG. 2, same reference numerals denote the same parts as in FIG. 1.

When the circuit breaker 11 is drawn outside the enclosed switchboard of this type, the upper and lower disconnecting switches 12 and 13 become exposed. In such a case, an engineer may come in contact with the exposed disconnecting switches, which presents a danger. In order to solve this problem, in an enclosed switchboard of this type, when the circuit breaker 11 is drawn outside the switchboard, a shutter device covering the upper and lower disconnecting switches 12 and 13 in synchronism with the drawing operation is generally incorporated. This shutter device is of metal for the purpose of safety for the engineer.

In the metal shutter device, shutter plates 14 and 15 are at the ground potential. Therefore, when the shutter plates 14 and 15 are at the "closed" position, a clearance of insulation "X" between stationary arms 16 and 17 and the shutter plates 14 and 15 must satisfy the insulating level of the enclosed switchboard. Reduction in the clearance of insulation "X" therefore is an important factor in reducing the outer dimensions, especially the depth of the enclosed switchboard.

The clearance of insulation "X" as described above is determined by the construction of the disconnecting switches 12 and 13. FIG. 3 is an enlarged view of portion "A" of FIG. 1. FIG. 4 is a sectional view of the shutter plate 15 in the "closed" position. As shown in FIG. 3, a plurality of fingers 19 are mounted to a finger arm 18 of the circuit breaker 11 (FIG. 1) as a movable arm, so as to electrically connect the stationary arm 16 and the finger arm 18 through the fingers 19. For the purpose of smooth attachment and detachment of the fingers 19 to the stationary arm 16, an end part 20 of the stationary arm 16 is usually processed to have an R shape. In the case of the "closed" position of the shutter plate 15 shown in FIG. 4, the air break distance between the stationary arm 16 and the shutter plate 15 is defined as the clearance of insulation "X". As has been described hereinabove, the end part 20 of the stationary arm 16 is processed into an R shape for the purpose of achieving smooth attachment and detachment of the stationary arm 16 to the fingers 19. In addition to this, from the viewpoint of withstand voltage characteristics, rounding generally results in a reduction of the convergance of the electric field, and improvements in the utilization efficiency of the electric field and the withstand voltage characteristics. For this reason, theoretically, an electrode processed in R shape has a smaller clearance of insulation "X" than that of a rod electrode which is not processed into R shape for use as the stationary arm. However, this R shape usually has a radius of about 5 to 10 mm. When the clearance of insulation "X" is 150 to 300 mm, the processing in R shape of this range does not improve the withstand voltage characteristics, and reduction in the clearance of insulation "X" by processing in R shape may not be expected. When the shutter plate 15 is at the "closed" position, the electric field converges on the end part 20 of the stationary arm so that a streamer is generated, resulting in flashover.

SUMMARY OF THE INVENTION

It is an object of the present invention to provide a disconnect contact assembly wherein the convergence of the electric field at the end part of the stationary arm is moderated, the clearance of insulation "X" is reduced, and the enclosed switchboard for housing this is compact in size.

In order to achieve this object, there is provided according to the present invention a disconnect contact assembly characterized in that a movable arm reciprocally movable along the axial direction and a stationary arm to be connected or disconnected according to the reciprocal movement of the movable arm are provided, and an electric field moderating ring which is electrically connected to the stationary arm surrounds the contact end of the stationary arm.

BRIEF DESCRIPTION OF THE DRAWINGS

FIG. 3 is a sectional view of the conventional disconnect contact assembly under the condition in which a circuit breaker is connected thereto;

FIG. 4 is a sectional view showing the conventional disconnect contact assembly shown in FIG. 3 when the circuit breaker is disconnected and the shutter plate is in the "closed" condition;

FIG. 5 is a sectional view showing an embodiment of a disconnect contact assembly according to the present invention;

DETAILED DESCRIPTION OF THE PREFERRED EMBODIMENTS

Figure 1:
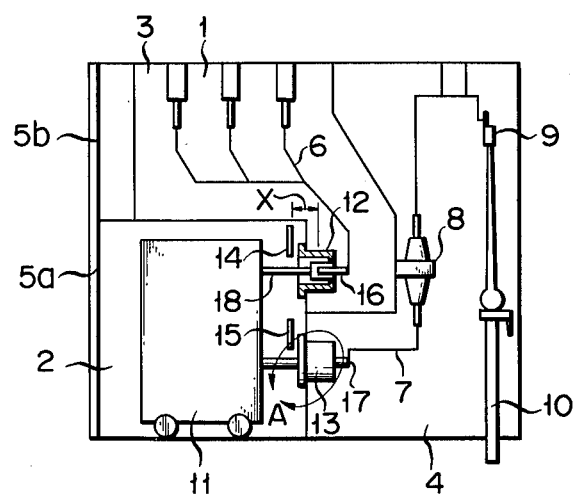
FIG. 1 is a schematic view of a typical conventional enclosed switchboard.
Figure 2:
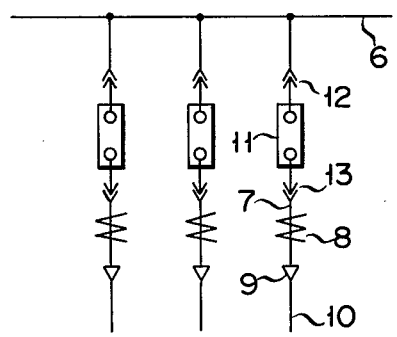
FIG. 2 is a view showing the electrical connections of the enclosed switchboard shown in FIG. 1.

Preferred embodiments of the present invention will now be described with reference to the accompanying drawings. In the description to follow, the same reference numerals denote the same parts as in FIGS. 3 and 4.

In an embodiment shown in FIG. 5, an open end of a cylindrical insulator 21 with a bottom is closed by the grounded shutter plate 15. Under this condition, the movable arm, that is, the finger arm 18 and the fingers 19 are separated from the stationary arm 16. Therefore, the shutter plate is in the "closed" condition. The stationary arm 16 is axially mounted through the bottom of the insulator 21 in such a manner that its projecting flange 25 is securely attached to the inner surface of the bottom of the insulator 21. The open end of the cylindrical insulator 21 opens to the interior of the equipment chamber 2 shown in FIG. 1.

A metal ring 23 with an insulator coating 22 is arranged around the outer circumference of the stationary arm 16, leaving a space to allow insertion of the fingers 19 at the side of the movable arm 18 shown by the dot-dash line in FIG. 3. The insulator coating 22 of insulating material such as epoxy resin is formed on the surface of a metal ring 23. This metal ring 23 is mounted on the base of the stationary arm 16, that is, the projecting flange 25 of the stationary arm 16 to be electrically connected thereto. This metal ring 23 moderates the convergence of the electric field at the end part 20 of the stationary arm. Since an electric field of the same intensity as that at the end part 20 of the stationary arm converges at an end part 24 of the metal ring 23, the electric field at each end part is thereby attenuated. Since the insulator coating 22 is formed on the surface of the metal ring 23 to achieve a composite insulating structure, the withstand voltage characteristics are vastly improved. The clearance of insulation "X" may be reduced to about $\frac{1}{2}$ to $\frac{1}{3}$ its original value by forming the insulator coating 22 in a thickness of about 2 mm.

Figure 6:
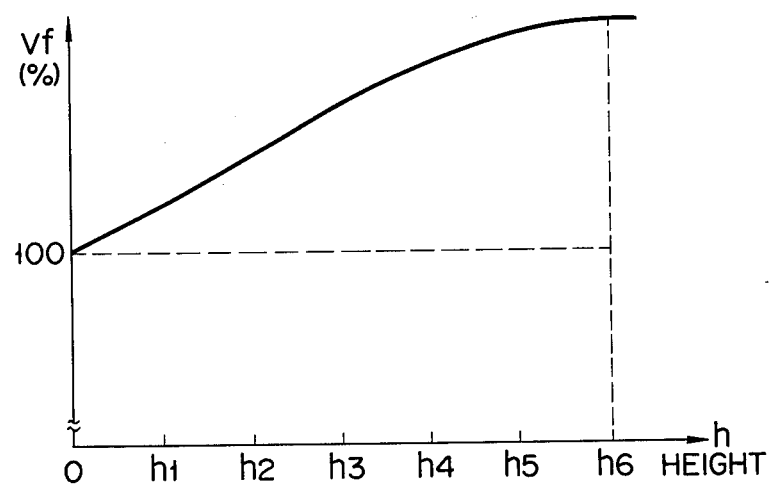
FIG. 6 is a graph showing the relationship between the height of an electric field moderating ring from the base of the stationary arm in the embodiment shown in FIG. 5 and flashover voltage.

It has been confirmed according to experiments that the withstand voltage characteristics of an electric field moderating ring 26 consisting of the metal ring 23 and the insulator coating 22 vary according to the value of a height h of the metal ring 23 from the base or projecting flange 25 of the stationary arm 16. FIG. 6 shows the relationship between this height h and a 50% flashover voltage (voltage that causes flashover in 50% of the cases). As may be seen from FIG. 6, when the height h is gradually increased from 0, in the manner of h1, h2, h3, ..., the flashover voltage Vf gradually becomes high. A 100% flashover voltage Vf is obtained when the electric field moderating ring 26 is not used. The flashover voltage is saturated when h=h6 and does not increase even when the height h is further increased. The height h6 is defined, as shown in FIG. 5, as the height obtained when the angle θ is 30°, this angle θ being formed by the front end surface of the stationary arm 16 and the line connecting the center at the front end of the stationary arm 16 with the front end of the metal ring 23. As may be seen from FIG. 6, the flashover voltage Vf becomes about twice that obtained when the ring 26 is not used. It is thus seen that the clearance of insulation "X" may be decreased to about half.

Figure 7:
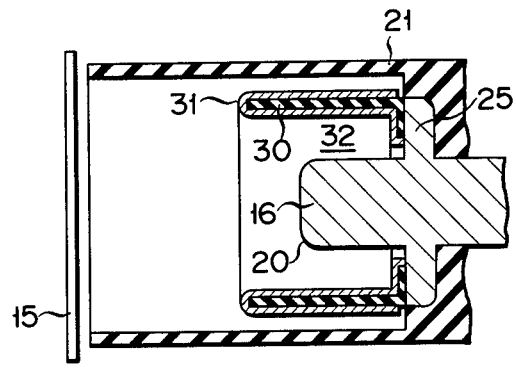
FIG. 7 is a sectional view showing the main part of another embodiment of the present invention.

In the embodiment shown in FIG. 5, the electric field moderating ring 26 consisting of the metal ring 23 and the insulator coating 22 was used. However, an electric field moderating ring may alternatively be used which consists of an insulator ring and a high resistance layer formed by a coating of a high resistance paint on the surface of the insulator ring. FIG. 7 shows the main part of an embodiment for achieving this. In this embodiment, a cylindrical insulator ring 30 of an insulating material is mounted on the base 25 of the stationary arm 16 to surround the stationary arm 16. A high resistance layer 31 of a high resistance paint is coated on the surface of the insulator ring 30 to constitute an electric field moderating ring 32. As a high resistance paint, resin material containing carbon and having a specific resistance of about $10^3$ to $10^5$ Ω-cm is commercially available, and this may be used in this embodiment. One end of the high resistance layer 31 is coated so as to be in contact with the stationary arm 16.

With the construction as described above, the electric field at the end part 20 of the stationary arm may be uniformly distributed due to the presence of the high resistance layer, so that the electrical field acting on the end part 20 may be moderated.

For forming the high resistance layer 31, instead of the high resistance paint coating as described above, a thermally contactile high resistance tube having a specific resistance of the same order of magnitude may be arranged over the surface of the insulator ring 30.

Figure 8:
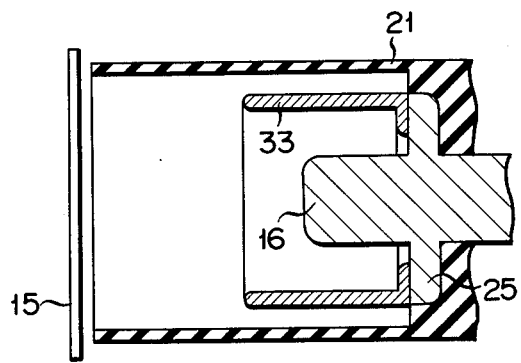
FIG. 8 is a sectional view showing the main part of still another embodiment of the present invention.

In another embodiment shown in FIG. 8, an electric field moderating ring 33 of a high resistance material is formed on the base 25 of the stationary arm 16. As the high resistance material to be used in this embodiment, a resin material having a specific resistance of about $10^3$ to $10^5$ Ω-cm may be used. For example, the same material as that used for the high resistance layer 31 of FIG. 7 may be used. The clearance of insulation "X" may also be reduced in this manner.

The description has been made with respect to the embodiment wherein the clearance of insulation "X" between the metal shutter plate 15 and the stationary arm is reduced. However, a clearance of insulation "X" between the end part 20 of the stationary arm and an opposing grounding metal (not shown), for example, a window type current transformer, may be reduced in addition to the clearance of insulation between the metal shutter plate 15 and the stationary arm.

In summary, according to the present invention, since the electric field moderating ring electrically connected to the stationary arm surrounds the end part of the stationary arm of the disconnect contact assembly, the clearance of insulation "X" to the opposing grounding metal, for example the shutter plate, may be reduced. The enclosed switchboard may thus be made compact in size.

What we claim is:

1. A disconnect contact assembly comprising:
   a tubular insulator having a bottom and an open end;
   a grounded shutter plate provided at the open end of said tubular insulator for closing said open end;
   a stationary arm fixed on said bottom and having a contact end protruding into said cylindrical insulator along the axial direction;
   an electric field moderating ring surrounded in a radially-spaced relationship by said tubular insulator and surrounding and electrically connected to said stationary arm and protruding for a predetermined distance from said contact end of said stationary arm toward said grounded shutter plate but which does not extend to the level of the open end of said tubular insulator to have a sufficient clearance of insulation from said grounded shutter plate; and
   a movable arm reciprocally movable along said axial direction between one position at which the movable arm comes into contact with said contact end of said stationary arm while said grounded shutter plate is open and another position at which the movable arm is out of said cylindrical insulator while said grounded shutter plate is being closed wherein said stationary arm and movable arm are surrounded in a radially-spaced relationship by said electric field moderating ring.

2. A disconnect contact assembly according to claim 1, wherein said electric field moderating ring includes a metal ring electrically connected to said stationary arm, and an insulator coating covering at least the surface of a front end of said metal ring.

3. A disconnect contact assembly according to claim 1, wherein said electric field moderating ring includes an insulator ring mounted on said stationary arm, and a high resistance layer electrically connected to said stationary arm and covering the surface of said insulator ring.

4. A disconnect contact assembly according to claim 1, wherein said electric field moderating ring includes a cylindrical body of a high resistance material which is mouned on said stationary arm to surround it and to be in electrical contact therewith.

* * * * *